Nov. 21, 1939.  J. J. N. VAN HAMERSVELD  2,180,488
CHUCK CLOSING AND OPENING MECHANISM
Filed Jan. 17, 1936  8 Sheets-Sheet 1
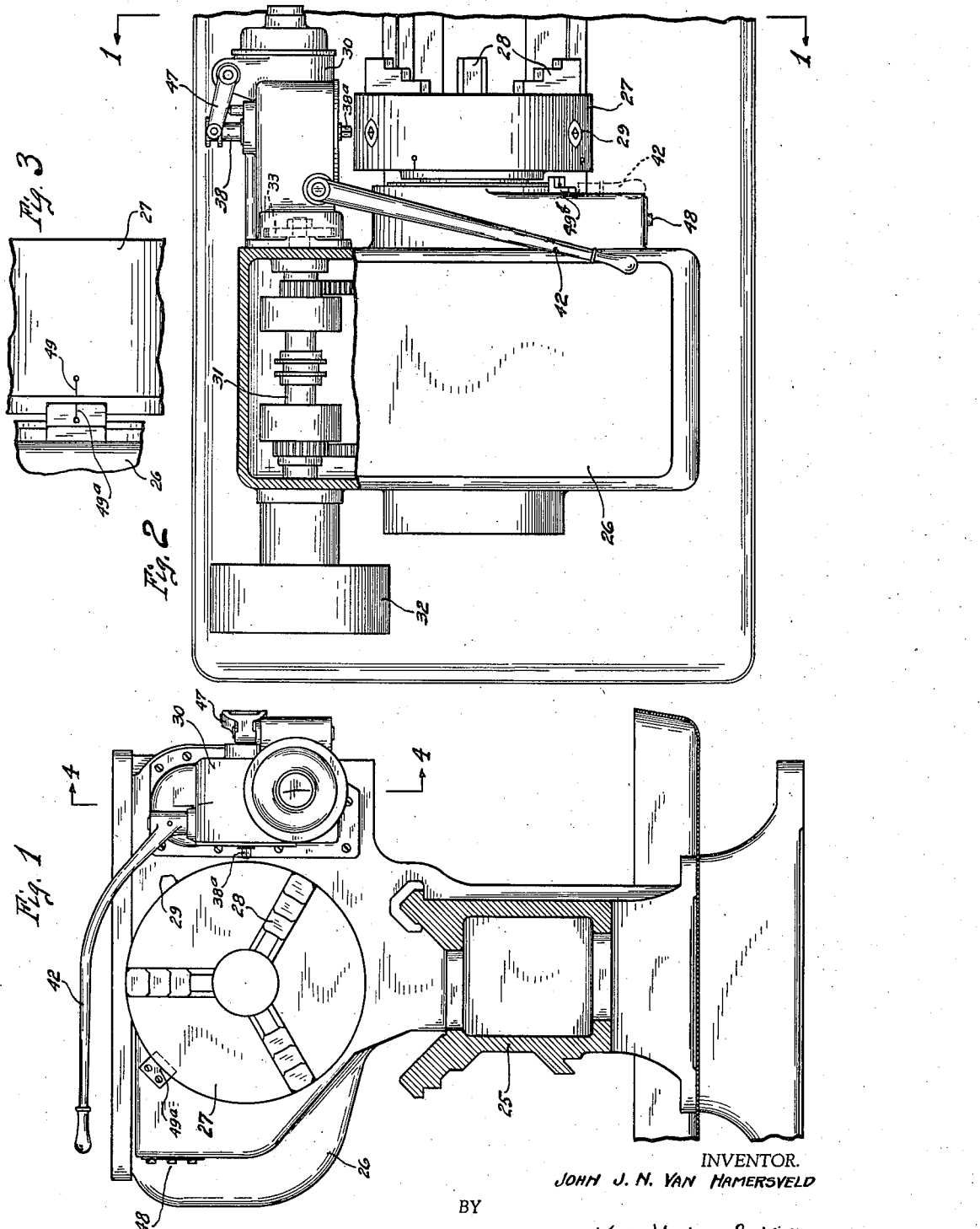
INVENTOR.
JOHN J. N. VAN HAMERSVELD
BY
Kwis Hudson & Kent
ATTORNEYS.

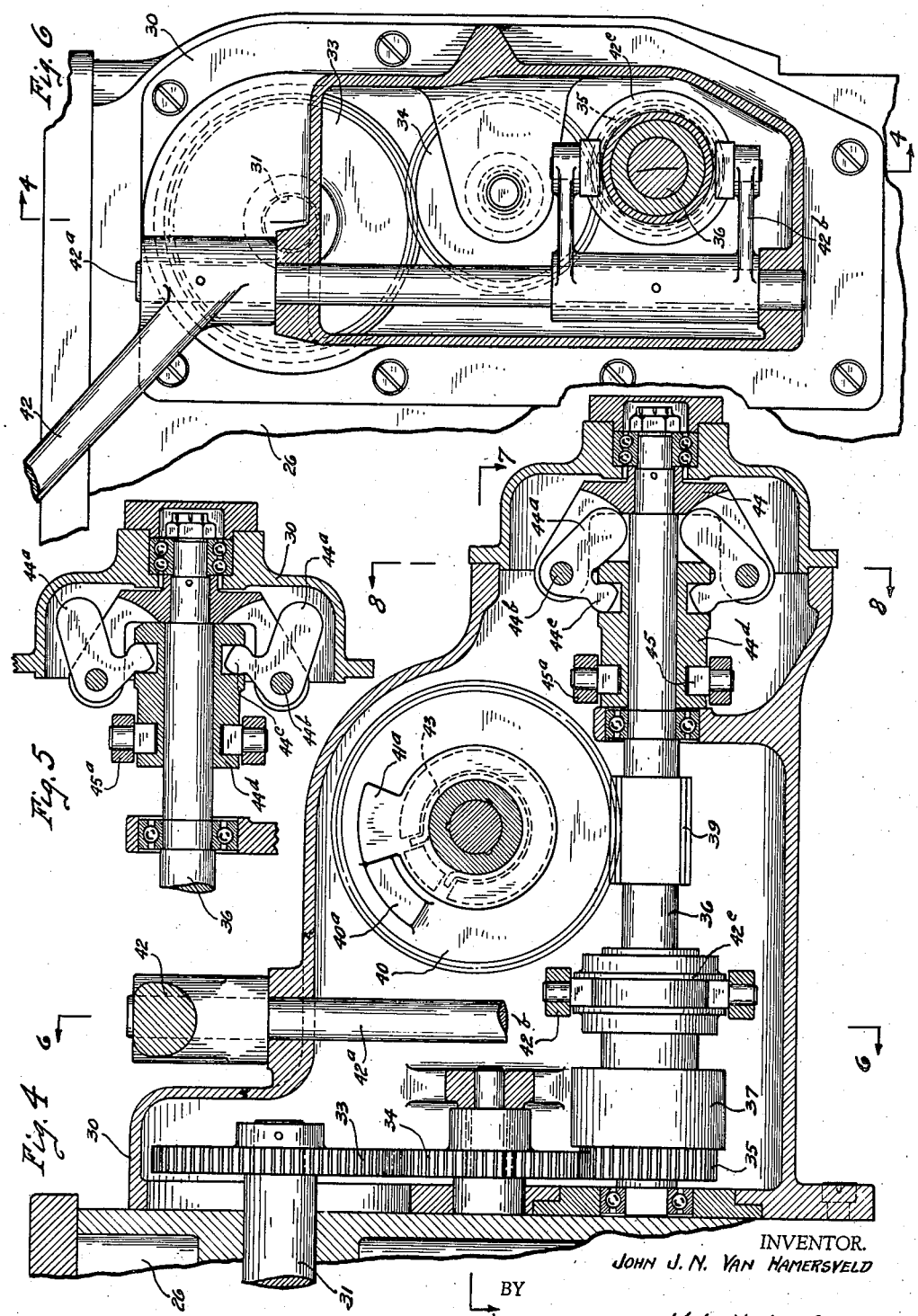

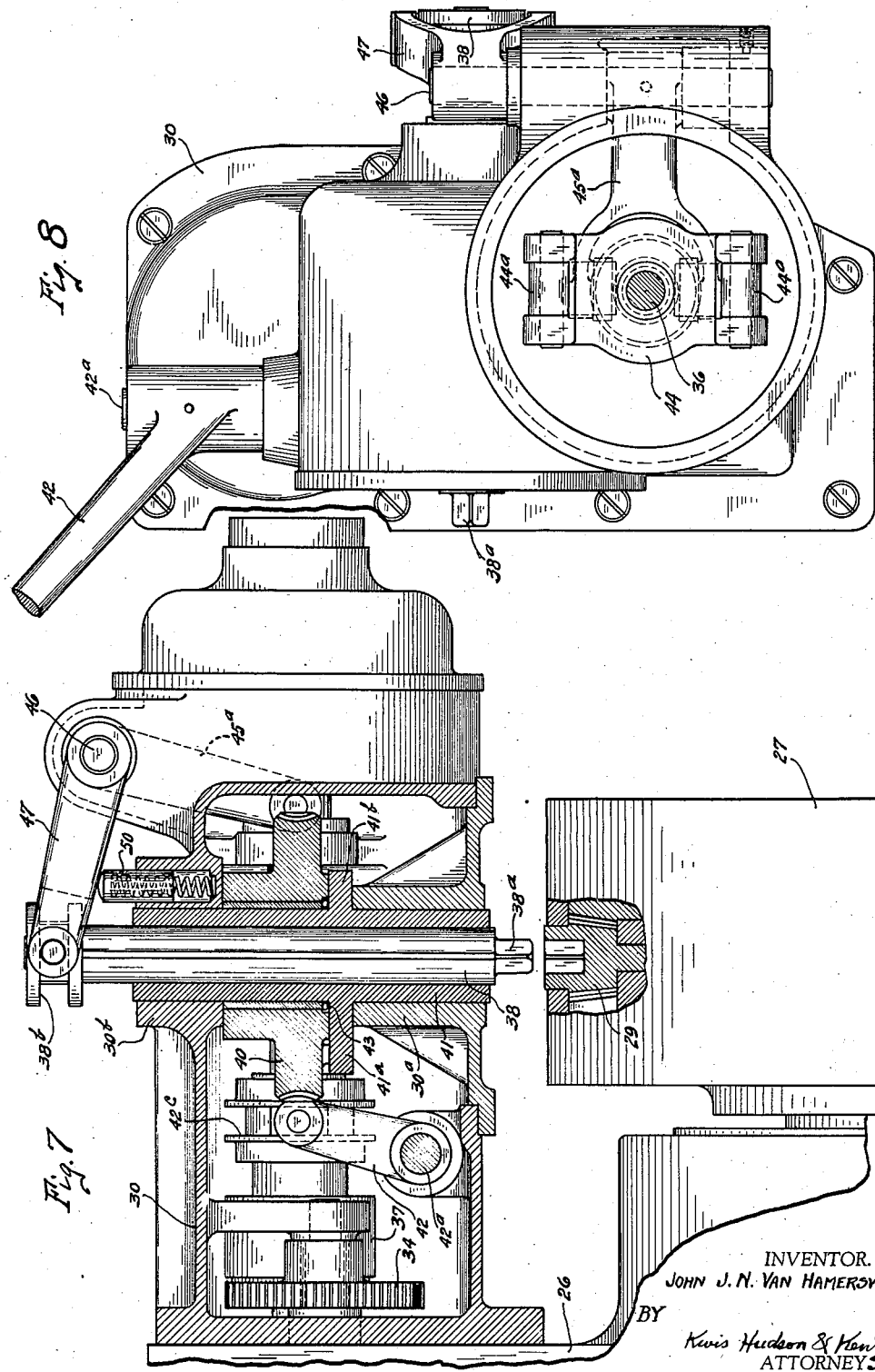

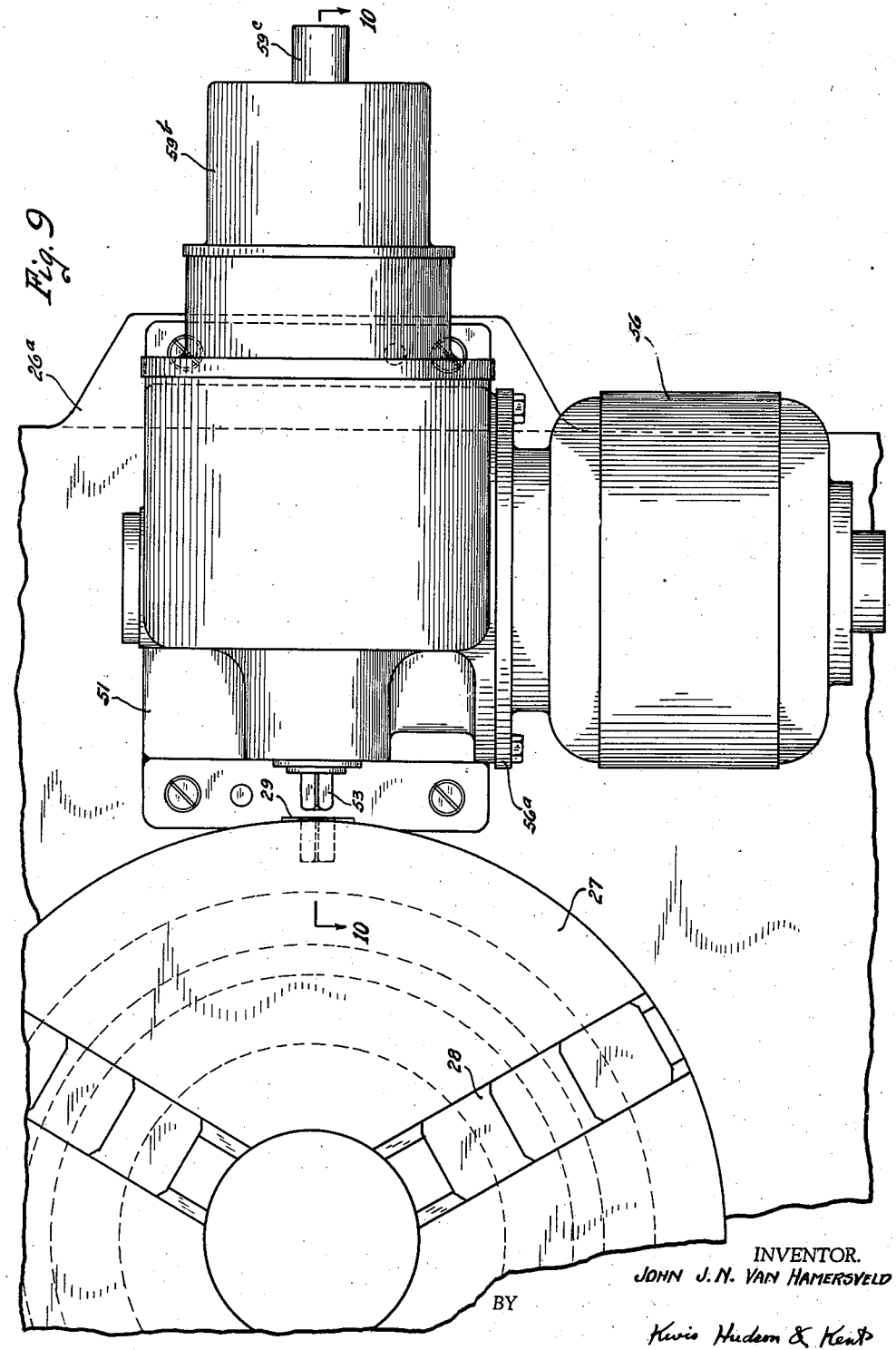

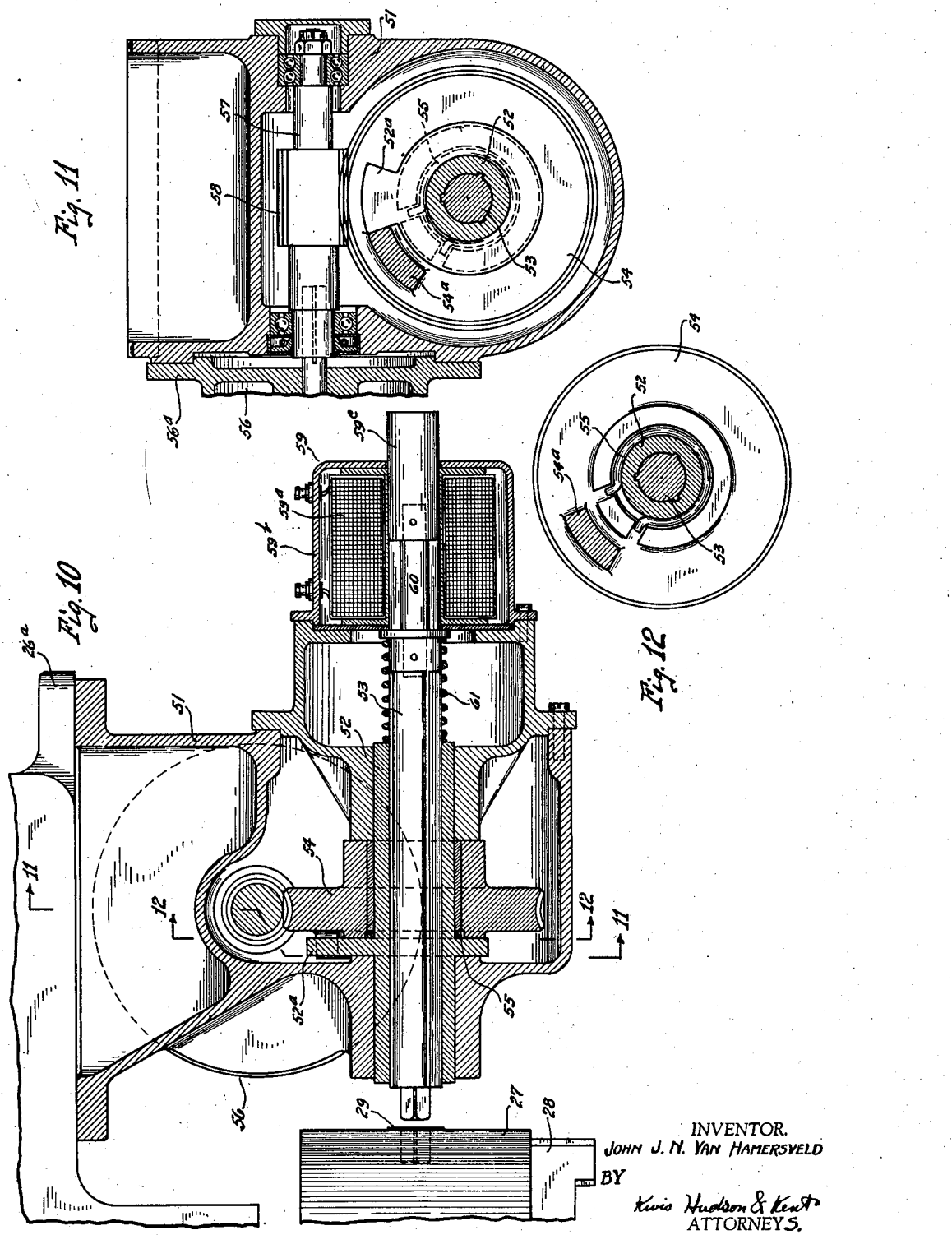

Nov. 21, 1939.  J. J. N. VAN HAMERSVELD  2,180,488
CHUCK CLOSING AND OPENING MECHANISM
Filed Jan. 17, 1936  8 Sheets-Sheet 6
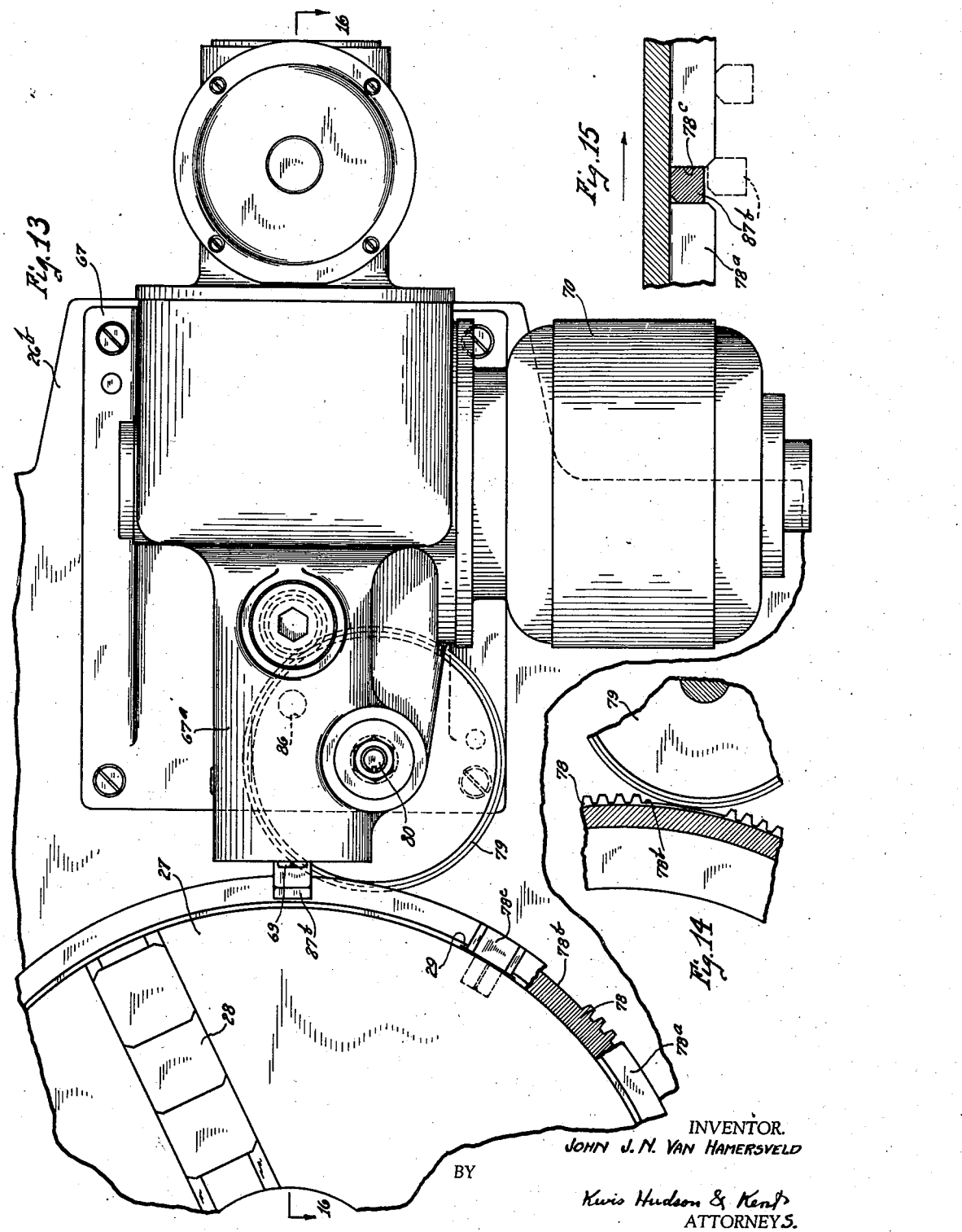
INVENTOR.
JOHN J. N. VAN HAMERSVELD
BY
Kwis Hudson & Kent
ATTORNEYS.

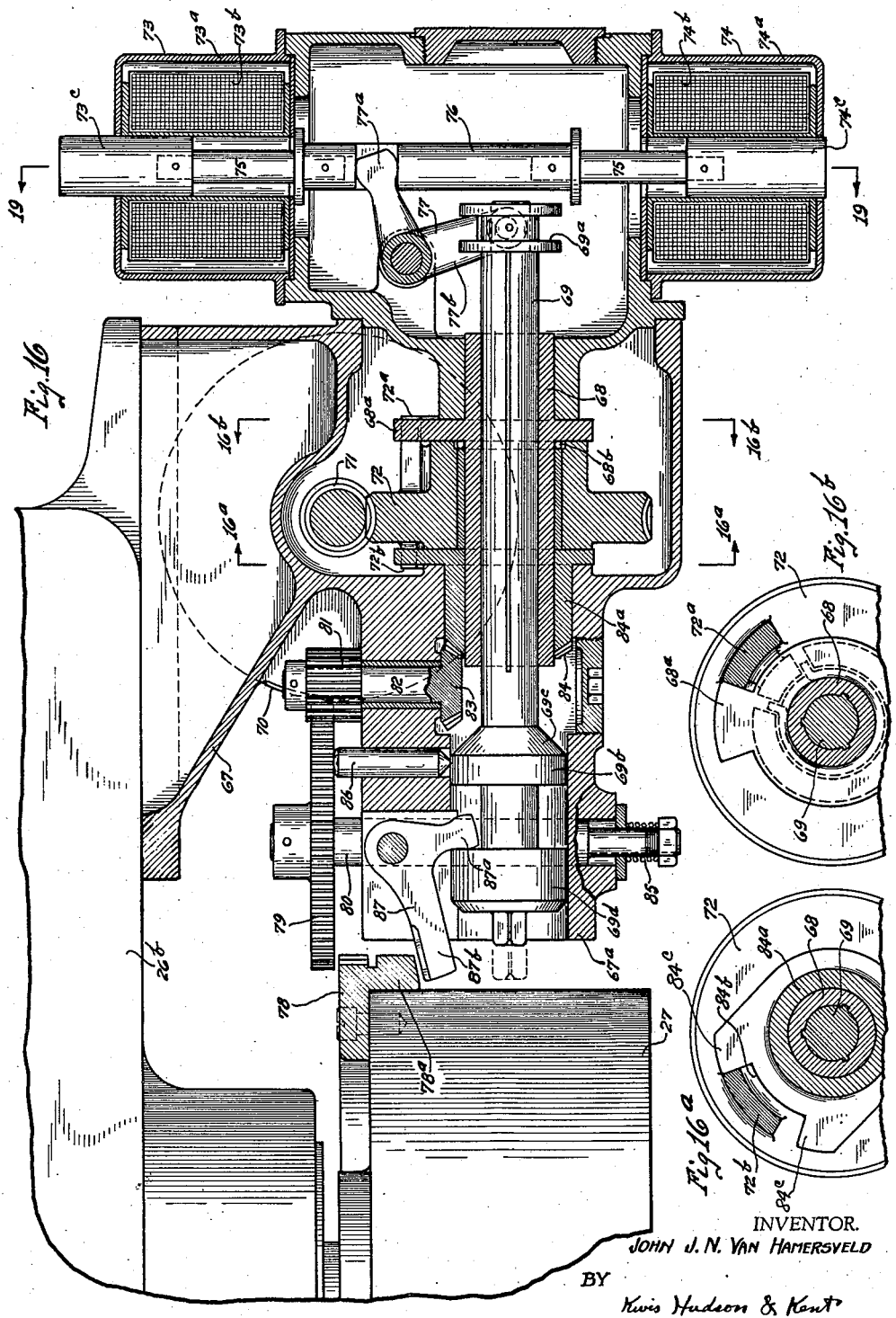

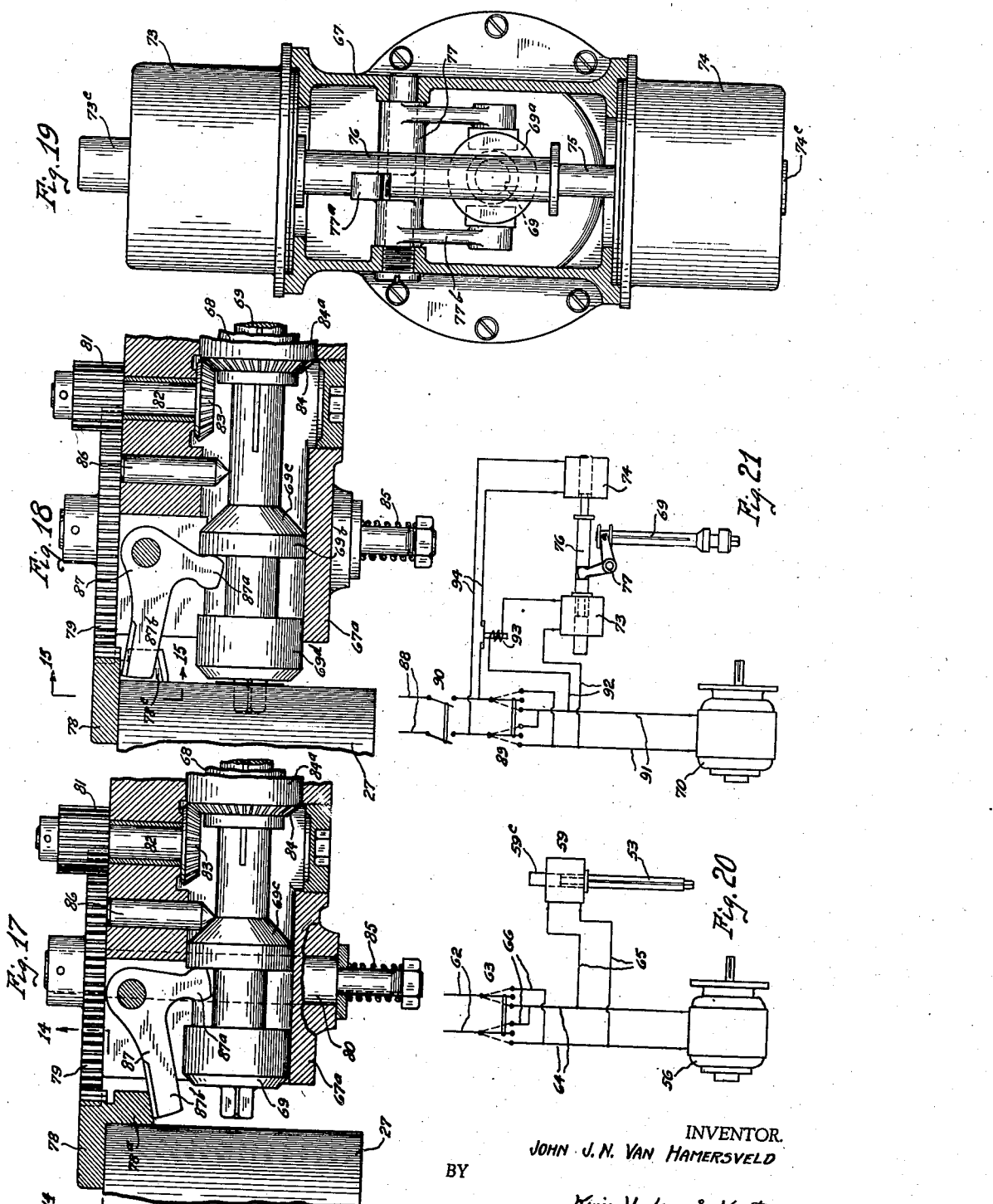

Patented Nov. 21, 1939

2,180,488

UNITED STATES PATENT OFFICE 2,180,488

CHUCK CLOSING AND OPENING MECHANISM

John J. N. Van Hamersveld, Cleveland Heights, Ohio, assignor to The Warner & Swasey Company, Cleveland, Ohio, a corporation of Ohio Application January 17, 1936, Serial No. 59,571

15 Claims. (Cl. 279—1)

This invention relates to power operated chuck closing and opening mechanisms wherein an element or part of the chuck which is suitably connected with the jaws or work engaging means is actuated by a motor or source of power to move the jaws into or out of engagement with the work. More particularly the invention relates to power operated chuck closing and opening wrenches wherein a wrench or actuator is moved laterally toward the periphery of the chuck to engage a pinion or other actuated element of the chuck and is then turned to close or open the chuck, after which the wrench is disengaged by moving it laterally in the opposite direction.

One of the main objects of the invention is to eliminate the necessity for manually moving the wrench or other actuating member into and out of engagement with a pinion or other actuated member of the chuck and to provide a chuck closing and opening mechanism wherein this function is performed automatically or by power actuated means.

A further object of the invention is to provide a chuck closing and opening mechanism wherein the movement of the actuating member to operative position and the application of power to turn the actuating member occur substantially simultaneously.

A further object is to provide means for causing the automatic disengagement of the actuating member from the chuck or from the part thereof which it actuates when the chuck closing or opening operation is completed.

A further object of the invention is to do away with the necessity of the manual turning of the chuck body by the operator to properly align the actuated member thereof with the actuator so that the latter may move into engagement with the actuated member and permit the chuck closing and opening mechanism to function, and to accomplish this result automatically and through power actuated means, and, additionally, to hold the chuck body in the position stated while the chuck closing and opening mechanism is functioning.

A still further object is to provide an automatic power actuated shifting means for the actuating member which shifting means may be actuated by electrical or mechanical or equivalent means without attention on the part of the operator, the same becoming effective upon the application of power to rotate the actuating member.

A further object is to provide a single control for the instrumentalities used in causing the endwise movement and the rotation of the wrench, and, if desired, also for rotating the chuck body to proper position with respect to the actuating member.

The above and other objects are attained by the present invention which may be here briefly summarized as consisting in certain novel combinations and arrangements of parts which will be described in the specification and set forth in the appended claims.

In the accompanying sheets of drawings, wherein I have shown different embodiments of the invention, Fig. 1 is a vertical sectional view through the bed of a machine tool substantially along the line 1—1 of Fig. 2, looking toward the head of the machine tool and toward the rotary chuck which is carried by the spindle;

Fig. 2 is a plan view of the same with a portion broken away;

Fig. 3 is a fragmentary elevation on an enlarged scale of certain parts shown in Fig. 1;

Fig. 4 is an enlarged vertical sectional view substantially along the line 4—4 of Fig. 1 and along the line 4—4 of Fig. 6;

Fig. 5 is a fragmentary view showing the governor illustrated in Fig. 4 with the parts in a different position than in Fig. 4;

Fig. 6 is a vertical sectional view substantially along the line 6—6 of Fig. 4;

Fig. 7 is a horizontal sectional view substantially along the line 7—7 of Fig. 4;

Fig. 8 is a view partly in elevation and partly in section along the line 8—8 of Fig. 4;

Fig. 9 is a view on an enlarged scale looking toward the chuck as the same is viewed in Fig. 1, showing a modified form of chuck closing and opening mechanism, the mechanism here shown being electrically operated and including a separate motor as distinguished from the power operated mechanism of the previous views wherein the power is derived from a shaft which drives the spindle;

Fig. 10 is a horizontal sectional view substantially along the line 10—10 of Fig. 9;

Fig. 11 is a vertical sectional view substantially along the line 11—11 of Fig. 10;

Fig. 12 is a similar view substantially along the line 12—12 of Fig. 10;

Fig. 13 is a view similar to Fig. 9 showing a modified form of electrically operated wrench;

Fig. 14 is a fragmentary sectional view substantially along the line 14—14 of Fig. 17;

Fig. 15 is a fragmentary sectional view of a gear member substantially along the line 15—15 of Fig. 13;

Fig. 16 is a horizontal sectional view substantially along the line 16—16 of Fig. 13;

Fig. 16a is a fragmentary sectional view substantially along the line 16a—16a of Fig. 16;

Fig. 16b is a similar view substantially along the line 16b—16b of Fig. 16;

Fig. 17 is a fragmentary sectional plan view showing some of the parts in Fig. 16 but in a different position from that there shown;

Fig. 18 is a similar view with the same parts in a still different position;

Fig. 19 is a view looking toward the left of Fig. 16 with certain parts in vertical section along the line 19—19 of Fig. 16;

Fig. 20 is a diagrammatic view of the electric circuit which may be used with the electrically operated wrench such as illustrated in Figs. 9 to 12; and Fig. 21 is a similar diagrammatic view of the electric circuit which may be used with the electrically operated wrench illustrated in Figs. 13 to 19.

The chuck closing and opening mechanism embodying the several features of the present invention may be utilized to advantage for closing and opening the chucks or other devices for holding work pieces or the like of many different types of machines, but, for convenience, the holding device will be referred to as a chuck which is generally provided with a plurality of radially movable jaws, the chuck herein illustrated being a universal scroll chuck which usually has a plurality of pinions, frequently three in number, mounted in the peripheral portion of the chuck body, each having a square socket to receive a wrench and each meshing with a gear attached to the scroll which shifts the jaws or work engaging members radially inward and outward. It might be mentioned also at this point that the power which is necessary for the functioning of my improved cruck closing and opening mechanism may be derived from a motor, such as an electric motor separate and distinct from the spindle drive, or the power for operating the mechanism may be derived from the motor which drives the spindle on which the chuck is mounted, as by taking the power from one of the shafts of the spindle drive. Both forms of the invention are herein illustrated, and the latter method of drive will be described first.

Referring first to Figs. 1 to 8, I have illustrated a part of a machine tool of the lathe type although the type of machine is not important to the invention. The tool here shown includes a bed 25 portions of which are shown in Figs. 1 and 2, a head 26 having a spindle at the forward end of which is mounted a chuck 27, in this instance of the universal scroll type and including a cylindrical chuck body having radially movable jaws 28 and having at its periphery a plurality of spaced square-socketed pinions 29 any one of which may be turned to actuate the scroll so as to move the jaws inwardly or outwardly in the well known manner. In the appended claims, the term "actuated member" or "actuated element" of the chuck will include one of these pinions or its equivalent.

The chuck closing and opening mechanism is in all forms of the invention herein illustrated attached to a suitable part of the machine tool, but it need not be in the form of an attachment and may be built into the machine tool as well. In this instance, the attachment is located on the forward end of the head 26 at the rear side of the chuck 27 with its actuating member, in this instance in the form of a rotary and endwise movable wrench, arranged horizontally and movable toward and away from the periphery of the chuck on the rear side thereof into and out of engagement with one of the pinions 29. In Figs. 1 to 8 the mechanism includes a housing 30 designed to be bolted to the head as indicated in several of the views. In this instance the power which is applied to the actuator or actuating member of the chuck closing and opening mechanism is derived from one of the spindle driven shafts 31 which is a continuously driven shaft deriving its power from any suitable source. As here shown, this shaft 31 is provided at one end with a driving pulley 32 (Fig. 2) which is generally driven by an electric motor (not shown). With the particular drive for the wrench illustrated in Figs. 1 to 8, the pulley 32 will be driven by a reversing electric motor such as is used with many machine tools having a spindle which is driven in both forward and reverse directions.

The forward end of the shaft 31, which is the power shaft for the chuck closing and opening mechanism, extends through the forward end of the head 26 into the housing 30, being provided at its forward end with a gear 33 which, through an idler gear 34, drives a gear 35 designed to be clutched to shaft 36 through a friction clutch indicated conventionally at 37. This shaft drives through suitable reduction gearing, in this instance worm and worm wheel gearing, and a lost motion connection, the actuating member or chuck closing and opening wrench 38 which is arranged horizontally at the rear side of the chuck, as previously explained. The worm and worm wheel gearing in this instance includes a worm 39 secured to or integral with the shaft 36 and engaging a worm wheel 40 which is rotatably mounted on a wrench sleeve 41 (see particularly Fig. 7) supported in spaced bearings 30a and 30b at the front side and rear side respectively of the housing 30. The wrench 38 is slidable in the sleeve 41 and is in splined relation therewith, it being noted that by this arrangement the wrench is relieved of thrust due to the transmission of power through the worm gearing to the sleeve and therefore to the wrench itself. A lost motion driving connection is provided between the worm wheel 40 and the sleeve 41 in order that a hammer blow may be imparted to the wrench to release the jaws from or to tightly close them on the work piece. This is accomplished in this instance by providing on one face of the worm wheel 40 a forwardly projecting lug 40a which lug overlaps or is in the plane of movement of a lug 41a on a flange 41b on the sleeve 41 and located at the side of the worm wheel, as illustrated in Figs. 4 and 7.

The transmission of power from the shaft 31 of the head to the shaft 36 of the chuck closing and opening mechanism and therefore through the worm gearing and sleeve 41 to the wrench 38 is controlled by a hand lever 42 which preferably extends over the head substantially to the front thereof within easy reach of the operator, as shown in Figs. 1 and 2. The full line position shown in Fig. 2 indicates the inactive or inoperative position of the hand lever 42 and the dotted line position shown in the same figure indicates the operative position. It will be understood that when the lever is in the full line position of Fig. 2 the friction clutch 37 on shaft 36 is disengaged, and when the lever is thrown to the dotted line position of Fig. 2, the clutch 37 is engaged so as to cause the wrench spindle to be rotated by the shaft 36 through the intervening mechanism referred to above. The inner or rear end of the lever 42 is mounted on the upper end of a vertical shaft 42a (Fig. 6), the lower end of the lever having arms 42b engaging the shoe ring 42c on shaft 36, as indicated in Figs. 4, 6, and 7.

It will be obvious that the wrench sleeve 41 is driven from the worm wheel 40 by the engagement of the lug 40a thereof with the lug 41a of the sleeve, and also that before the driving lug 40a of the worm wheel engages the lug 41a of the sleeve there will be an idle movement, depending upon the initial position of the lug 40a with reference to the lug 41a, and when the engagement occurs, a blow will be imparted to the wrench sleeve 41 and therefore to the wrench 38. For a reason to be explained presently, before the forward squared end of the wrench engages in the socket of one of the chuck pinions 29 and therefore before the wrench is put under load, it is desirable that the worm wheel 40 drive the wrench sleeve 41 without disturbing the initial spacing between the driving lugs 40a and 41a and therefore before driving relation is established between these lugs. For that purpose a friction drag is provided between the worm wheel 40 and the wrench sleeve 41 which in this instance is in the form of a wire spring 43 which substantially encircles the wrench sleeve next to the flange 41b thereof and is seated within an annular groove formed on a slight boss on the worm wheel 40 with the free ends of the spring projecting into slots cut in the face of this boss. Before the wire spring is slid on the sleeve, its bore is somewhat smaller in diameter than the diameter of the sleeve about which it fits so that when it is slid onto the sleeve and after the parts are assembled, the tendency of the spring to contract causes a hugging or gripping action on the wrench sleeve 41, and since the ends of the spring are in the slots on the boss of the worm wheel 40, so that the spring turns with the worm wheel, the contracting tendency of the spring and its gripping action on the wrench sleeve 41 will cause it to temporarily drive the sleeve 41 until the squared forward end of the wrench is seated in the socket of the chuck pinion 29. When that occurs, the wrench 38 and the wrench sleeve 41 are temporarily held stationary until the driving lug 40a of the worm wheel comes into abutting relation with the lug 41a of the wrench sleeve, whereupon by this driving relation the power applied to the wrench is transmitted to the pinion of the chuck to move the jaws to closed or open position.

Heretofore, so far as I am aware, it has always been necessary for the operator to manually move the wrench into engagement with the pinion or other wrench actuated member of the chuck, and it is a feature of the present invention that the manual shifting of the wrench in an endwise direction into or out of engagement with the actuated member of the chuck is eliminated and that this movement is imparted automatically or by power operated means. To accomplish this result, I provide on the shaft 36 a governor, in this instance a centrifugal governor, including a governor body 44 pinned or otherwise secured to the forward end of the shaft 36 within the housing 30. The governor body is provided with weights 44a pivoted at 44b to the governor body and provided with arms 44c which engage in a circular groove of a sleeve 44d slidable on the shaft 36 in the manner best illustrated in Figs. 4 and 5. This sleeve 44d has a second circular groove in which are engaged shoes 45 carried by a lever 45a (see Fig. 8) which is pinned or otherwise secured to a vertical shaft 46 mounted in bearings in a portion of the housing 30 and at its upper end projects through the top of the housing where it is provided with a lever 47 having shoes engaging in a circular groove 38b at the rear end of the wrench spindle 38, the grooved rear end of the spindle projecting horizontally rearward out of the housing 30, as best shown in Figs. 2 and 7.

In Fig. 4 the governor weights are shown in the position which they occupy when the shaft 36 is stationary and the chuck closing and opening mechanism is inoperative with the wrench stationary and in its rearwardmost position, indicated in Figs. 1 and 7. When it is desired to either close or open the chuck, the operator throws the hand lever 42 from the full line position to the dotted line position shown in Fig. 2, thus causing the engagement of the friction clutch 37, which results in the shaft 36 being rotated in a given direction, depending upon whether the chuck jaws 28 are to be moved inwardly or outwardly. This in turn is determined by the direction of rotation of the shaft 31, the direction of rotation of this shaft being under the control of the operator generally through push button switches 48, in this instance shown on the front of the head 26 in Figs. 1 and 2 and controlling the motor (not shown) which rotates the pulley 32. Though the wrench itself is rotating at relatively low speed since a high ratio speed reduction gearing is employed to drive the wrench spindle from the shaft 36, the shaft 36 rotates relatively rapidly, and, as soon as it starts to rotate, the governor weights are moved outwardly by centrifugal force moving the sleeve 44d in an endwise direction, and this in turn rocks the bell-crank lever consisting of the lever arm 45a, the shaft 46, and the lever arm 47, causing the wrench to be moved in an endwise direction toward the periphery of the chuck 26. Previous to this, the chuck will be properly positioned to receive the squared end 38a of the wrench, this being accomplished in this case by the operator who will manually turn the chuck body until he lines up a marker 49 on the chuck with a corresponding marker 49a on a part 49b attached to the adjoining portion of the head. When the end of the wrench comes into engagement with the pinion, it may not at that instant be able to enter the squared socket of the pinion, but after a slight rotation it will do so.

Previous to the engagement of the end of the wrench in the socket of the pinion, the wrench was rotated from the wrench sleeve 41 by the drag imparted by the wire spring 43 but as soon as the squared end of the spindle is seated in the socket of the pinion, this drag becomes ineffective and thereupon the driving lug 40a rotates relative to the lug 41a, and as soon as they come into engagement, which occurs after a predetermined lost motion movement, the wrench spindle is positively driven so as to close or open the chuck. If the jaws are being opened, there will be a sufficient hammer blow imparted to the wrench to effectively start the opening movement. At the end of the closing movement a slipping occurs at the friction clutch 37 so as to avoid breakage of any of the driving parts.

After the completion of the chuck closing movement, or of the chuck opening movement, the operator will throw the hand lever 42 back to neutral position, and this disengages the clutch 37, stopping the transmission of power to the wrench-operating shaft 36. When this occurs, the wrench is automatically moved outwardly to the position shown in Figs. 2 and 7, and this is accomplished by the action of a spring plunger 50 engaging the lever 47, as shown in Fig. 7. When this movement takes place, the lever 45a restores the sleeve 44d and the governor weights from the position shown in Fig. 5 to the position shown in Fig. 4.

In some instances it is desirable that the motor or power means which rotates the wrench be separate and distinct from the motor which rotates the chuck spindle and therefore that the power for rotating the wrench be derived from an independent motor rather than from a shaft of the head-stock or from the drive between the chuck spindle and the motor which rotates it. In such event the independent motor will constitute a part of the chuck opening and closing attachment or unit which is applied to the machine tool. In that case, the shaft 36 of the above described construction will be driven by an independent motor which would be of the reversible type capable of being stalled when a maximum load is applied, as when the jaws of the chuck are closed upon the work. In such case the friction clutch 37 and the gears 33, 34, and 35 would not be employed.

In the succeeding figures of the drawings I have shown very simple, compact, and effective chuck closing and opening mechanisms utilizing an independent electric motor as a part thereof and employing also automatic means for shifting the wrench in an endwise direction, this being accomplished in this instance by electrical rather than by mechanical means employed with the first described construction.

Referring to Figs. 9 to 12, it will be seen that I have here shown a chuck closing and opening mechanism in the form of an attachment consisting of a self-contained unit which is attached to the head 26a in the same relation to the chuck 27 as before. This attachment or unit includes a housing 51 which is bolted to the head. Journaled in this housing in horizontal position opposite the chuck is a wrench sleeve 52 in which is splined an endwise movable wrench 53, the sleeve and wrench being similar in construction and arrangement to the corresponding parts of the equipment first described. Rotatably mounted on the sleeve is a worm wheel 54 with a driving lug 54a which is adapted to have a lost motion driving connection with a lug 52a on a flange of the wrench sleeve 52 precisely as before, and, likewise, there as employed a wire spring 55 as a friction-drag between the worm wheel and the sleeve to rotate the wrench when not under load, similar to that employed in the construction first described.

Secured to the lower side of the housing 51 is an electric motor 56 disposed with its axis vertically, this motor having at the upper end of its housing a circular flange 56a which is bolted to an annular flange on the bottom side of the housing 51. This motor is of the reversible type and is designed to stall under predetermined load which is created when the jaws of the chuck are moved into engagement with the work piece or when the jaws reach the outward limit of their movement in case the operator fails to stop the motor when the jaws move out of engagement with the work piece. The upper end of the vertical shaft of the motor projects into the housing 51 and is keyed to a worm shaft 57 journaled in the housing 51, this shaft having a worm 58 which meshes with the worm wheel 54, see Fig. 11.

For the purpose of automatically moving the wrench in an endwise direction, I employ a solenoid 59 composed of a coil 59a arranged in a housing 59b which is secured on the rear side of the housing 51 coaxially with the wrench. Attached to the outer or rear end of the wrench is an extension 60 formed of non-magnetic material, such as brass, and secured to the outer end of this extension is a solenoid core 59c of magnetic material, such as iron, this core normally projecting rearwardly beyond the solenoid housing, as shown in Fig. 10, and being normally held in that position by a spring 61. In the construction herein illustrated, the solenoid, when energized, draws the core inwardly and moves the wrench against the tension of spring 61 toward the periphery of the chuck so as to cause its squared forward end to engage in the socket of the pinion or other actuated member of the chuck, and when the solenoid is deenergized, the spring 61 withdraws the wrench spindle from the chuck and restores the parts to the normal position shown in Fig. 10. The magnetic pull of the solenoid is of course ample to overcome the pressure or resistance of the spring when the wrench is moved to chuck engaging or operative position. A very stiff spring 62 is not required in view of the fact that the wrench is capable of moving freely through the wrench sleeve due to the fact that the sleeve has a bearing at each side of the worm wheel and, when the spring is functioning, the sleeve and the wrench are not in driving relation.

The solenoid may be energized slightly before or slightly after the energization of the motor, but preferably both are energized simultaneously through a single control member. A circuit suitable for this purpose is indicated in Fig. 20 wherein the current supplying conductors 62 are shown connected to the control device which is in the form of a switch 63 of any desired type. The switch may be of standard construction suitable for supplying current to the motor for both forward and reverse directions of rotation, and in this instance I have shown diagrammatically a two-pole, double-throw switch which, when in neutral position, disconnects both the motor and the solenoid from the supply circuit. As here shown, when the switch is moved in one direction from neutral it engages contacts which connect the supply conductors 62 to leads 64 extending to the motor. These leads are connected by conductors 65 to the solenoid so that both the motor and the solenoid will be energized simultaneously, the direction of current flow being such that the motor will run in one direction which, for convenience, I will assume to be the forward direction. When the switch is thrown from neutral position in the opposite direction with the blades engaging a different set of contacts which are connected to the leads 64 by branch leads 66, the current through the motor is reversed, causing it to rotate in the opposite direction, but the solenoid will be energized and will function as before. Any suitable type of reversing motor may be employed actuated either by A. C. or D. C. current.

Thus it will be seen that when the operator desires to close or open the chuck after he has manually turned the chuck body to proper position with respect to the wrench, he has simply to close the switch 63 by moving it in one direction or the other, depending upon whether the chuck is to be closed or opened. This starts the motor rotating in the proper direction and, at the same time, energizes the solenoid 59 so that the wrench is automatically moved endwise into engagement with the chuck and its squared forward end will slip into the socket of the pinion or other actuated member of the chuck, whereupon the driving lug 54a comes into engagement with the lug 52a of the wrench sleeve with a hammer blow and the chuck jaws are therefore moved so as to close or open the chuck, as the case may be. After the closing or opening movement is completed, the operator will throw the switch to neutral position so as to deenergize both the motor and the solenoid, whereupon the wrench is moved back in an endwise direction to normal position by the spring 61. It is to be remembered that when the motor is deenergized the wrench is free to move without any thrust relation between the wrench and the sleeve.

In Figs. 13 to 19 I have shown a chuck closing and opening mechanism which not only closes and opens the chuck by power and automatically moves the wrench spindle to and later from operative position but performs automatically an additional important function, namely, turns or moves the chuck body to properly position the chuck pinion or actuated member with respect to the wrench so that the latter may move readily into engagement with the pinion or actuated member of the chuck. In this construction I have introduced a further modification consisting in the positive withdrawal of the wrench from the chuck, as well as the positive shifting of the wrench to operating position with respect to the chuck, thus doing away with the use of a spring for withdrawal purposes, as in the constructions previously described.

Referring now to Figs. 13 to 19, it will be seen that I have provided on the head 26b, in the same relation with respect to the chuck as before, a housing 67 which is preferably bolted to the end of the head at the rear of the chuck, and in this housing I provide a wrench sleeve 68 in which is slidably mounted and splined a wrench 69 which, as in the prior constructions, moves horizontally in an endwise direction to and from the chuck. On the lower side of the housing is secured a reversing electric motor 70 which by means of a worm 71 on a shaft driven by the motor in the manner indicated in Fig. 11 drives a worm wheel 72 which is rotatably mounted on the wrench sleeve 68 and drives the latter precisely as previously explained, except that the driving lug 72a on the worm wheel 72 and the lug 68a on the flange of the sleeve 68 are on the opposite side of the worm wheel from their location in the first described constructions. The spring wire for the friction drag is here designated 68b, the same being located and functioning as before. On the rear side of the housing are two solenoids 73 and 74 in solenoid housings 73a and 74a and composed of solenoid coils 73b and 74b and cores 73c and 74c which cores are connected by pieces of non-magnetic material 75 to an endwise movable shifting bar 76 which is mounted for horizontal movement at the rear of the wrench and at right angles thereto. Movement is transmitted from the shifting bar 76 to the wrench by means of a bell-crank 77 which, as shown in Figs. 16 and 19, has an arm 77a extending into a notch of the shifting bar 76 and a pair of arms 77b straddling a shoe ring 69a at the rear end of the wrench and having shoes engageable in the groove thereof. Thus it will be seen that when the solenoid 74 is energized the parts are in the normal positions shown in Fig. 16, with the wrench withdrawn from the chuck, and when the solenoid 73 is energized and the solenoid 74 deenergized, the wrench is moved to operative position indicated in Fig. 18. The functioning of these solenoids will be referred to presently in connection with the diagrammatic view, Fig. 21, showing the circuit connections.

In order that this chuck closing and opening mechanism may perform the additional function of turning and therefore properly positioning the chuck body with reference to the wrench, I provide at the periphery of the rear part of the chuck body a ring gear 78 which, as here shown, is substantially L-shaped in cross-section with a flange 78a extending over a portion of the periphery of the chuck body, as shown in Figs. 16, 17, and 18. This gear is not continuously toothed but has untoothed portions one of which is shown at 78b in Fig. 14, there being one of these blank spaces or untoothed portions for each point at which the wrench may enter the chuck body to rotate the pinion or other actuated element which causes the jaws to be moved toward closed or open position. This ring gear 78 is adapted to be engaged by a gear 79 (see particularly Figs. 13, 16, 17, and 18) which is mounted on an endwise movable shaft 80 in an extension 67a of the housing 67 below the axis of the wrench spindle, as clearly shown in Fig. 13. The shaft is movable in an endwise direction so that the gear 79 may be brought into and out of engagement with respect to the ring gear 78 on the chuck body, it being shown out of engagement in Fig. 16 and in engagement in Figs. 17 and 18. The ends of the teeth on the adjacent sides of the gears 78 and 79 may be beveled in order that the gear 79 may readily slip into engagement with the teeth 78. The gear 79 is adapted to be rotated by a pinion 81 on a shaft 82 also journaled in the extension 67a of the housing 67 and provided at its inner end with a bevel pinion 83 engaging a bevel gear 84 formed at the forward end of a sleeve 84a which is rotatably mounted on the wrench sleeve 68, and, in turn, has a bearing in a part of the housing 67, as clearly shown in Fig. 16. As will be seen by reference to Figs. 16 and 16a, the sleeve 84a is adapted to be rotated by the worm wheel 72 and for that purpose the sleeve has a flange with a notch 84b in it, as shown in Fig. 16a, forming two horns 84c between which is received with a lost motion a lug 72b integral with the worm wheel 72, this lug 72b projecting forwardly or from the opposite face of the worm wheel from that on which is located the lug 72a which drives the wrench sleeve 68, as will be seen by reference to Fig. 16. The arrangement is such that the chuck body 27 is rotated by the worm wheel 72 independently of the wrench sleeve 68. The lost motion between the driving lug 72b on the worm wheel and the horns 84c on the flange of sleeve 84a is sufficient to permit the gear 79 to slip into full engagement with the ring gear 78 on the chuck body before the driving engagement between the lug 72b and one of the horns 84c takes place and therefore before the gears 84, 83, 81, and 79 are rotated.

The ring gear 79 is adapted to be moved into engagement with ring gear 78 by a spring 85 which surrounds the forward reduced end of shaft 80 at the front of the extension 67a of the housing 67. The gear 79 is positively moved out of engagement with the ring gear 78 on the chuck body by a pin 86 slidably mounted in the extension 67a of the housing, this pin at its outer end engaging the face of gear 79 and having a tapered inner end which is adapted to engage a flange 69b on the wrench 69, this flange having an annular portion and a cam face 69c leading therefrom. The arrangement is such that when the wrench is in normal position the tapered inner end of the pin 86 engages the periphery or annular portion of the flange 69b, as shown in Fig. 16, but during a portion of the forward movement of the wrench toward the chuck body from the position shown in Fig. 16 to the position shown in Fig. 17, the inner end of the pin rides down the cam surface 69b, as shown in Fig. 17, so as to permit the spring 85 to move the shaft 80 endwise and cause the engagement between gear 79 and the ring gear 78 on the chuck body, it being understood that this movement of the wrench is created by the energization of the solenoid 73, and, as will be explained, this occurs coincidentally with the deenergization of solenoid 74 and with the energization of the motor 70 which is now rotating the wrench and after the gear 79 is engaged with the ring gear 78 also rotates the gears 84, 83, 81, and 79.

By reference to Figs. 16, 17, and 18, it will be noted that there is provided in the extension 67a of the housing a bellcrank lever 87 which has an arm 87a extending inwardly toward the wrench in a circular groove formed by the flange 69b and by a second flange 69d which is located toward the outer end of the wrench. Likewise, the bell-crank has an outwardly projecting arm 87b which extends out from the housing extension 67a adjacent the forward face of the flange 78a of the ring gear 78 which, as previously explained, is secured to the chuck body. The function of this arm 87b of the bell-crank lever is to act as a pilot in definitely positioning the chuck body with respect to the wrench after the chuck body has been turned to approximately the proper position by the gear 79, and it serves also, as will be explained presently, to prevent the wrench moving outwardly too far until the chuck body has been properly positioned, i. e., keeps the wrench from striking the chuck body until the socketed member which is to receive the wrench is aligned therewith. To accomplish the piloting or positioning function of the chuck body, I provide in the flange 78a of the ring gear 78 a series of slots 78c one of which is provided for each position of the chuck body at which the wrench becomes effective. That is to say, if the chuck has any given number of pinions or other actuated devices adapted to be engaged by the wrench, spaced uniformly about the periphery of the chuck body, there will be a corresponding number of these slots which are properly located with respect to the untoothed portion 78b of the ring gear. The outer edges of these slots may be beveled as shown in Fig. 15, and the adjacent edges of the arm 87b of the bell-crank lever 87 are preferably similarly beveled so as to facilitate the entrance of the positioning arm of the bell-crank into the slot. In this connection it might be stated further that when the teeth of the gear 79 move into the untoothed portion 78b of the ring gear 78, the slot 78a of the ring gear will be approximately opposite the positioning arm 87b, and, in any event, the slot will be sufficiently close to the adjacent portion of the positioning arm 87b that the latter will, by virtue of the beveled edges, promptly slide into the slot and thus position the chuck precisely with respect to the wrench, it being remembered that the solenoid 73 is at all times exerting a force on the wrench tending to move the forward end into operative engagement with the wrench actuated element of the chuck.

The construction is such that when the wrench operating motor and the solenoid 73 are energized, the wrench starts to turn and at the same time the wrench is moved forwardly. As it moves forwardly, the gear 79 slides into engagement with the ring gear 78 of the chuck body, as previously explained, but the endwise movement of the wrench is stopped with its forward end located close to the periphery of the chuck body but not in contact therewith, as shown in Fig. 17. It was stopped in this position by the engagement of the arm 87b of the bell-crank lever with the front face of the flange 78a of the ring gear, the arm of the bell-crank having been moved to that position by the rocking of the bell-crank due to the engagement of the flange 69b of the wrench with the inwardly projecting arm 87a of the bell-crank. The parts remains in this position until the chuck has been rotated a sufficient distance to bring one of the slots 78c of the ring gear opposite the positioning arm 87b of the bell-crank 87, and as soon as this occurs, the force exerted by the solenoid 73 to move the wrench endwise causes the arm 87b of the bell-crank lever to move into the slot, and this permits the forward squared end of the wrench, which is now in alignment with a socket in the pinion or actuated element of the chuck, to enter the socket thereof, whereupon the driving relation is established by the lugs of the worm wheel and the wrench sleeve and the wrench proceeds to then shift the jaws of the chuck to closed or open position, as the case may be. After the chuck has been operated, i. e., closed or opened, the motor circuit will be opened by the operator, and if it is not opened in time, the motor will stall and prevent the breakage of any parts of the mechanism. Upon the opening of the circuit, both the solenoid 73 and the motor are deenergized, and, as will be seen by reference to the electric circuit shown in Fig. 21, the solenoid 74 is simultaneously energized and the wrench is withdrawn from the chuck and moved again to the normal or inoperative position shown in Fig. 16.

Referring now to Fig. 21, in this figure the motor and solenoids have the reference characters appearing on the other views, and the current supplying conductors are designated 88. For the control of the motor and the solenoids I prefer to employ a single switch which, as here shown, is in the form of a double-pole, double-throw switch 89 which is shown in neutral position by full lines and in its two operative positions by dotted lines. A master switch 90 may be employed to connect and disconnect the switch 89 from the supply circuit, this master switch being left closed during the entire period that the machine tool is being operated. Two of the contacts of the switch 89 are connected by conductors 91 to the motor 70. These two conductors are connected by branch conductors 92 to the coil of the solenoid 73 and in one of these conductors is the coil of a relay switch 93. The other solenoid 74 is connected by conductors 94 to the conductors 88 between the master switch 90 and the control switch 89, and in one of these conductors 94 are located the contacts of the relay switch 93. The arrangement is such that when the master switch 90 is closed, the solenoid 74 is immediately energized and holds the wrench in its normal inoperative position. When the wrench is to be operated to close or open the chuck, the operator closes the control switch 89 by moving it to the right or left, as the case may be, depending upon which direction the chuck jaws are to be moved, so as to start the motor in operation, and at the same time to energize the solenoid 73. This results in the energization of the relay switch 93 which immediately opens and deenergizes the solenoid 74 by opening the circuit of the coil of this solenoid, whereupon the solenoid 73 becomes effective to move the wrench in an endwise direction toward the chuck body, the wrench now being rotated by the motor, whereupon the parts function as explained above.

At the conclusion of the chuck closing or opening movement, the operator opens the control switch 89, whereupon the motor 70 is at once deenergized, the solenoid 73 is at the same time deenergized, the relay switch 93 is allowed to close, and the solenoid 74 is again energized and functions to withdraw the wrench to normal position and to hold it in that position until the operator desires to have the wrench again close or open the chuck. Of course, when the chuck is to be closed, the control switch 89 is moved to one operative position, and when it is to be opened, it is to be moved to its other operative position, but in either case the solenoids function as explained above.

I wish it to be understood that, in place of the single solenoid and the spring for shifting the wrench in the construction illustrated in Figs. 9 to 12 inclusive, I may employ the two solenoids illustrated in Figs. 13 to 19, and, if desired, in the construction shown in Figs. 13 to 19 I may employ the single solenoid and the spring (or equivalent return means), or the centrifugal governor and spring of the first described construction may be utilized for shifting the wrench endwise in both the second and third constructions described.

In conclusion, it might be stated by way of recapitulation that I have provided a chuck closing and opening mechanism having the following important characteristics:

(1) No manual operation is required to cause the wrench to engage the chuck or to move it away from the chuck.

(2) In the preferred arrangement, a single control device is employed which functions to control the application of power to the wrench to rotate it and also to cause the automatic engagement of the wrench with the chuck followed by its subsequent automatic disengagement.

(3) The power for rotating the wrench may be derived from one element of the drive utilized in rotating the spindle carrying the chuck or it may be derived from an independent motor, preferably an electric motor, although in some instances some other type of motor, such as hydraulic, may be used.

(4) In one form of my invention, one control element causes the wrench to be rotated and moved into engagement with the chuck and in another form of the invention the chuck is automatically positioned before the wrench is moved to its final operative position without any further act on the part of the operator than the manipulation of a single control member.

Above I have described my invention in its different forms as being used in connection with a universal chuck wherein all jaws are simultaneously moved by rotating one of several pinions any one of which may be engaged by the wrench and rotated to cause all the chuck jaws to move in or out. However, my invention is equally applicable to what is well known as the independent chuck wherein the jaws, of which there are generally four, are moved independently of one another. Generally, in a chuck of this kind two of the jaws are properly positioned with respect to the work piece and left in that position while the other two jaws are moved toward or away from the work piece to grip it or release it. Such a chuck may be operated advantageously with my improved mechanism herein disclosed, the only difference being that two closing or two opening operations would be required instead of one, it being understood, of course, that between the two closing or the two opening operations the chuck body would be rotated one-fourth revolution to locate the usual screw or other actuated member with respect to the wrench.

In all forms of the present invention, as herein illustrated, the forward end of the wrench is shown as squared since with the forms herein shown it is adapted to enter the squared socket of a pinion. It will be understood, of course, that the forward end of the wrench will be suitably shaped to accommodate the part which it is adapted to engage, and in some instances the forward end of the wrench will have a socket, as, for example, to receive the squared end of the screw of an independent chuck. In some instances the forward end of the wrench may be toothed in the form of a pinion or gear, as would be the case if the chuck were provided with a scroll or other type of gear adapted to be engaged and rotated directly by the wrench without the intervening pinions as in the universal chuck herein illustrated.

In the constructions herein described, the wrench is moved in an endwise direction toward the chuck automatically by a governor in one instance and a solenoid in other instances. However, the wrench may be moved endwise by other mechanical or electrical instrumentalities of an equivalent nature.

While I have shown certain forms of the invention, it will be apparent that changes may be made in the construction and arrangement of parts, and I therefore aim in my claims to cover all modifications which do not involve a departure from the spirit and scope of my invention in its broadest aspects.

Having thus described my invention, I claim:

1. A closing and opening mechanism for the jaws of a chuck, said mechanism including a wrench supported for both rotatable movement and endwise movement from a normal position laterally of the chuck into engagement with a part of the chuck to be actuated, and power means for rotating the wrench and for moving it endwise from its normal position to the chuck, the power means having both a lost motion connection with the wrench for rotating it and means for transmitting rotary movement to the wrench independently of the lost motion connection and before the latter becomes effective.

2. A closing and opening mechanism for the jaws of a chuck, said mechanism including a wrench, means supporting said wrench for both rotary movement and endwise movement from a normal position laterally of the chuck into engagement with a part of the chuck to be actuated, power means for rotating the wrench and for moving it endwise from its normal position to the chuck, additional power means for retracting the wrench at the conclusion of the opening or closing operation and for moving it back to its normal position, and movable means constituting an operative connection between said additional power means and said wrench.

3. A closing and opening mechanism for the jaws of a chuck, said mechanism including a wrench supported for both rotary movement and endwise movement from a normal position laterally of the chuck into engagement with a part of the chuck to be actuated, and power means for rotating the wrench and for moving it endwise from its normal position to the chuck, the power means including a rotatable member for imparting the rotary movement to the wrench and centrifugal means operated by said member for giving the wrench its endwise movement to operative position while it is being rotated.

4. A closing and opening mechanism for the jaws of a chuck, said mechanism comprising a wrench, means supporting said wrench for both a rotatable movement and an endwise movement from a normal position laterally of the chuck into engagement with a part of the chuck to be actuated, power operated means for rotating said wrench and for moving it endwise toward said chuck, means for rotating the chuck body to position the chuck for engagement by the wrench and including an operative connection between said power operated means and said chuck and which connection has a displaceable element mounted independently of said wrench for interrupting said connection, and means operatively associated with said wrench and said last named means and controlled by the endwise movement of the wrench for controlling said element to complete or interrupt said connection.

5. A closing and opening mechanism for the jaws of a chuck, said mechanism comprising a wrench, means supporting said wrench for both a rotatable movement and an endwise movement from a normal position laterally of the chuck into engagement with a part of the chuck to be operated, power operated means for rotating said wrench and for moving the same endwise toward said chuck, means constituting a driving connection between said power operated means and said chuck to position the latter for engagement by the wrench and including a shiftable motion transmitting element for interrupting said operative connection, and means for shifting said element and including a movable member mounted independently of the wrench, and a device for controlling the movement of said member operated by the endwise movement of said wrench.

6. A closing and opening mechanism for the jaws of a chuck, said mechanism comprising a wrench, means supporting said wrench for both a rotatable movement and an endwise movement from a normal position laterally of the chuck into engagement with a part of the chuck to be operated, power operated means for rotating said wrench and for moving the same endwise toward said chuck, means constituting a driving connection between said power operated means and said chuck to position the latter for engagement by the wrench and including a shiftable motion transmitting element for interrupting said operative connection, and means for shifting said element and including a slidable member and a cam for controlling the movement of said member and operated by the endwise movement of said wrench.

7. A closing and opening mechanism for the jaws of a chuck, said mechanism comprising a wrench, means supporting said wrench for both a rotatable movement and an endwise movement from a normal position laterally of the chuck into engagement with a part of the chuck to be operated, power operated means for rotating said wrench and for moving the same endwise toward the chuck, means constituting a driving connection between said power means and said chuck for rotating the latter to position it for engagement with the wrench and including a shiftable motion transmitting element mounted independently of the wrench for interrupting the operative connection, means mounted independently of the wrench constantly urging said element toward operative position, and means controlled by the movement of said wrench for holding said element in an inoperative position.

8. A closing and opening mechanism for the jaws of a chuck, said mechanism comprising a wrench, means supporting said wrench for both a rotatable movement and an endwise movement from a normal position laterally of the chuck into engagement with a part of the chuck to be operated, power operated means for rotating said wrench, a driving connection between said power operated means and said chuck for rotating the latter to position the same to receive said wrench, and cooperating means carried by said mechanism and said chuck for controlling the endwise movement of said wrench toward said chuck until the latter is properly positioned and including a shiftable chuck locking member having a portion located between shoulders on said wrench and which shoulders are spaced apart longitudinally of the wrench to permit a limited endwise movement thereof independently of the shifting movement of said locking member.

9. A closing and opening mechanism for the jaws of a chuck, said mechanism comprising a wrench, means supporting said wrench for both a rotatable movement and an endwise movement from a normal position laterally of the chuck into engagement with a part of the chuck to be operated, power operated means for rotating said wrench, means constituting a driving connection between said power operated means and said chuck for rotating the latter to position the same to receive said wrench and including a shiftable element for interrupting said driving connection, said chuck and said mechanism being provided with cooperating means for controlling the endwise movement of said wrench and for locking the chuck in wrench receiving position and including a movable locking member having a portion located between shoulders formed on said wrench and which shoulders are spaced apart longitudinally of the wrench so as to permit limited endwise movement thereof independently of the movement of said locking member, and means engaging one of said spaced shoulders and controlled by the endwise movement of the wrench for controlling the positioning of the shiftable element in said driving connection.

10. A closing and opening mechanism for the jaws of a chuck, said mechanism including a wrench supported for both rotatable movement and endwise movement from a normal position laterally of the chuck into engagement with a part of the chuck to be actuated, power means for rotating the wrench and for moving it endwise from its normal position to chuck engaging position, and means operatively connecting said wrench with said power means to effect rotation of said wrench and including a friction driving connection and a positive driving connection, said connections being sequentially effective.

11. A closing and opening mechanism for the jaws of a chuck, said mechanism including a wrench supported for both rotatable movement and endwise movement from a normal position laterally of the chuck into engagement with a part of the chuck to be actuated, power means for rotating the wrench and for moving it endwise from its normal position to chuck engaging position, a lost motion driving connection between said power means and said wrench for rotating the latter, and a friction driving connection between said power means and said wrench for rotating the latter prior to said lost motion connection becoming effective.

12. A closing and opening mechanism for the jaws of a chuck, said mechanism comprising a wrench, means supporting said wrench for both a rotatable movement and an endwise movement from a normal position laterally of the chuck into engagement with a part of the chuck to be actuated, power operated means for rotating said wrench, power operated means for moving said wrench endwise toward said chuck, a third power operated means for moving said wrench endwise from its chuck engaging position to its normal position laterally thereof, and movable means constituting an operative connection between said last named power operated means and said wrench.

13. A closing and opening mechanism for the jaws of a chuck, said mechanism comprising a wrench, means supporting said wrench for both a rotatable movement and an endwise movement from a normal position laterally of the chuck into engagement with a part of the chuck to be actuated, power operated means for rotating said wrench, power operated means for moving said wrench endwise in both directions, and means constituting a force-varying operative connection between said last named power means and said wrench.

14. A closing and opening mechanism for the jaws of a chuck, said mechanism comprising a wrench, means supporting said wrench for both a rotatable movement and an endwise movement from a normal position laterally of the chuck into engagement with a part of the chuck to be actuated, power operated means for rotating said wrench, a solenoid for moving said wrench endwise toward said chuck, a second solenoid for moving said wrench endwise away from said chuck, and means constituting a force-varying operative connection between both of said solenoids and said wrench.

15. A closing and opening mechanism for the jaws of a chuck, said mechanism comprising a wrench, means supporting said wrench for both rotary movement and endwise movement from a normal position laterally of the chuck into engagement with a part of the chuck to be actuated, power means for rotating the wrench and for moving it endwise from its normal position to the chuck, said power means including a rotatable member for imparting rotary movement to the wrench, and centrifugal means operated by said rotatable member, and a force-varying operative connection between said centrifugal means and said wrench for translating operative movement of said centrifugal means into endwise movement of said wrench.

JOHN J. N. VAN HAMERSVELD.